United States Patent
Baratin et al.

(10) Patent No.: US 8,769,877 B2
(45) Date of Patent: Jul. 8, 2014

(54) THERMOPLASTIC FRAME FOR A SEALING OR WHEEL COVER PROFILED ELEMENT OF A MOTOR VEHICLE, PRODUCTION METHOD THEREOF, AND PROFILED ELEMENT COMPRISING SAME

(75) Inventors: Sylvain Baratin, Corquilleroy (FR); Philippe Chapeau, La Cour Marigny (FR); Mikaël Charles, Dordives (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 13/575,471

(22) PCT Filed: May 20, 2011

(86) PCT No.: PCT/IB2011/052215
§ 371 (c)(1),
(2), (4) Date: Sep. 28, 2012

(87) PCT Pub. No.: WO2011/145079
PCT Pub. Date: Nov. 24, 2011

(65) Prior Publication Data
US 2013/0180179 A1 Jul. 18, 2013

(30) Foreign Application Priority Data

May 20, 2010 (FR) ..................................... 10 02130

(51) Int. Cl.
*E06B 7/16* (2006.01)
(52) U.S. Cl.
USPC ....................................................... 49/490.1
(58) Field of Classification Search
USPC ............. 49/45.1, 490.1, 498.1; 428/122, 131, 428/134, 135, 136, 138, 140, 358
See application file for complete search history.

(56) References Cited

U.S. PATENT DOCUMENTS 1,967,514 A * 7/1934 Reld ................................ 49/441
4,271,634 A * 6/1981 Andrzejewski .............. 49/490.1
(Continued)

FOREIGN PATENT DOCUMENTS

DE 103 38 195 A1 3/2004
EP 0 418 116 A1 3/1991
(Continued)

OTHER PUBLICATIONS

International Search Report and Written Opinion for Application No. PCT/IB2011/052215 dated Sep. 14, 2011.

*Primary Examiner* — Jerry Redman
(74) *Attorney, Agent, or Firm* — Alston & Bird LLP (57) ABSTRACT

The invention provides a bendable thermoplastic reinforcement for a profiled seal or profiled molding of a vehicle, such a profiled element including same and a method for producing the reinforcement. The reinforcement of substantially U-shaped cross section, has a central portion and two arms, each arm having over its length a series of limbs separated from one another by slots. Over at least one part of the length of the reinforcement, each limb has laterally an asymmetrical geometry and an area greater than that of each adjacent slot. The reinforcement is produced by extrusion of a thermoplastic material via a die of U-shaped profile formed between an extruder head and a receiving member for the material being discharged from the head which is provided with a hollow cavity designed to form directly said central portion, the slots and limbs, so that the extruded material progressively covers the receiving member.

15 Claims, 4 Drawing Sheets

(56) References Cited

U.S. PATENT DOCUMENTS

| | | | |
|---|---|---|---|
| 4,610,907 A * | 9/1986 | Elvira | 428/122 |
| 4,745,665 A * | 5/1988 | Hilsenbeck | 24/295 |
| 5,305,552 A | 4/1994 | Guillon | |
| 5,686,165 A | 11/1997 | Cook | |
| 5,752,345 A * | 5/1998 | Bright et al. | 49/490.1 |
| 6,548,143 B1 * | 4/2003 | Heller | 428/122 |
| 6,742,255 B1 | 6/2004 | Frappier | |
| 7,997,030 B2 * | 8/2011 | Willett | 49/490.1 |
| 8,205,390 B2 * | 6/2012 | Ogilvie | 49/490.1 |
| 2004/0043188 A1 | 3/2004 | Tsujiguchi | |
| 2005/0144849 A1 * | 7/2005 | Boutin | 49/490.1 |
| 2005/0193635 A1 * | 9/2005 | Hemauer | 49/490.1 |
| 2006/0005471 A1 * | 1/2006 | Yamada et al. | 49/490.1 |
| 2008/0148646 A1 * | 6/2008 | Nozaki et al. | 49/490.1 |

FOREIGN PATENT DOCUMENTS

| | | |
|---|---|---|
| EP | 0 710 788 A1 | 5/1996 |
| EP | 1 093 902 A1 | 4/2001 |
| FR | 2 145 928 A5 | 2/1973 |
| FR | 2 187 076 A5 | 1/1974 |
| GB | 1 401 223 A | 7/1975 |

* cited by examiner

THERMOPLASTIC FRAME FOR A SEALING OR WHEEL COVER PROFILED ELEMENT OF A MOTOR VEHICLE, PRODUCTION METHOD THEREOF, AND PROFILED ELEMENT COMPRISING SAME

FIELD OF THE INVENTION

The present invention relates to a bendable thermoplastic reinforcement, in particular for a profiled seal or profiled trim molding of a motor vehicle, such a profiled element comprising the reinforcement, and a method for the production of said reinforcement. The invention relates, in particular, to such profiled elements which are capable of being fixed to a rebate of a frame and which form lateral or front/rear opening seals for motor vehicles of the tourism, utility or heavy goods type, such as for example side door entry seals, seals for the trunk, tailgate or swinging rear door, hood seals, sliding seals possibly of the internal semi-sliding type, single-rebate type or "truck style" type, double sealing gaskets, rear wheel housing seals or dirt-resistant seals.

BACKGROUND

Also disclosed in the document EP-B1-1 093 902 in the name of the applicant is a method for manufacturing a bendable thermoplastic reinforcement of U-shaped section, for example, for such profiled seals, said reinforcement having a central portion and two arms each comprising a series of symmetrical limbs which are separated from one another by slots. Said slots are obtained exclusively by calendering (i.e. without a post-forming operation) by the passage of the thermoplastic material between an engraved male wheel along a hollow cavity (i.e. defining the "negative" shape of the profiled reinforcement to be obtained) and a female wheel which tangentially covers said male wheel and which is driven in synchronous co-rotation therewith.

Calendered reinforcements set forth in this document provide satisfactory results. However, experience has shown that said calendered reinforcements do not always allow the profiled elements incorporating said reinforcements to be provided with sufficient clamping values to be held on the rebate, in contrast to a profiled element with a metal reinforcement. It is thus necessary either to increase the thickness of the limbs of the reinforcement or to modify the geometry thereof. Moreover, the profiled elements incorporating said reinforcements may have an overall appearance of "dog ribs" i.e. an unequal covering of the arms of the reinforcement by the coating material extruded on said reinforcement, thus impairing the appearance of the profiled element. Moreover, the cost of the material of the covering is high and greater than that of the material of the reinforcement.

SUMMARY

An object of the present invention is to propose a bendable thermoplastic reinforcement of substantially U-shaped cross section, in particular for a grip for a profiled seal or profiled molding of a motor vehicle, the reinforcement having a central portion and two arms, each arm comprising over its length a series of limbs, for example substantially triangular or trapezoidal which are separated from one another by slots, a reinforcement which in principle makes it possible to obtain a generally optimized operation when mounting the grip on/dismantling the grip from the profiled element incorporating said reinforcement on a rebate of a frame, following the radii of curvature more or less strictly and which also makes it possible to remedy the aforementioned drawback of "dog ribs".

To this end, a reinforcement according to the invention is such that over at least one part of its length, each limb has laterally (i.e. on its lateral wall viewed in the longitudinal direction of the reinforcement) an asymmetrical geometry and an area greater than that of each adjacent slot.

It is noteworthy that this particular geometry of the asymmetrical limbs and of said "interstitial" slots, results in an improved capacity for the bending of the profiled element incorporating said reinforcement, as the flexible coating filling said slots, which is present in a quantity which increases proportionally with its height relative to the neutral axis of the profiled element, is more easily stretched, permitting the profiled element to follow a radius of curvature which is smaller (by "neutral axis" is understood in the known manner the imaginary longitudinal line or plane of the profiled element not having any deformation of the compression or extension type when said profiled element follows a radius of curvature when bent).

According to a further feature of the invention, said arms may comprise a series of pairs of said asymmetrical limbs which, within each pair, are formed laterally opposite one another and which each have a free end of minimum width which is then offset relative to a transverse plane of this pair located at an equal distance from the start of said slots surrounding each limb.

Advantageously, each asymmetrical limb may have substantially the shape of a saw-tooth comprising two tooth edges which each have a straight or curved profile and which are joined at said free end of pointed or rounded shape, such that said at least one part of the reinforcement is substantially in the shape of a saw toothing, the teeth thereof being inclined on the same side.

It is noteworthy that said limbs forming said type of saw-toothing may have a uniform or even progressive inclination, (i.e. gradual, namely more and more pronounced in one direction of the reinforcement).

Even more advantageously, each asymmetrical limb may have substantially the shape of a comma, one of said tooth edges thereof being curved in a convex manner and the other tooth edge thereof being substantially straight or slightly curved in a concave manner. In other words, the interstitial slots adjacent to each of said asymmetric limbs may thus be delimited by edges which are closer together than in the prior art, which further minimizes the drawbacks of the appearance of the "dog ribs", further accentuating the aforementioned advantages.

According to a further feature of the invention all or part of said limbs, optionally including said laterally asymmetrical limbs, may each be tapered with a longitudinal width and/or a transverse thickness continuously decreasing toward the free end of the corresponding limb.

In other words, each of said laterally asymmetrical limbs may also be tapered toward its free end:

(i) laterally (i.e. with a decreasing width), or else
(ii) transversely (i.e. with a decreasing thickness), or even
(iii) both laterally and transversely (i.e. with a width and thickness which both decrease).

As a variant, said tapered shape of all or part of the limbs may also characterize some laterally symmetrical limbs which a reinforcement according to the invention may comprise, in addition to said laterally asymmetrical limbs, together with the three aforementioned possibilities (i), (ii)

and (iii) for said symmetrical limbs (which are, for example, substantially in the shape of an isosceles triangle or trapezium).

It is noteworthy that this laterally asymmetrical and/or (laterally and/or transversely) tapered geometry of the arms of the reinforcement according to the invention permits the U-shaped grip of the profiled element, incorporating said reinforcement covered by the flexible coating material, to have improved operation when mounted on/dismantled from the grip (i.e. the "hooking on/unhooking from" the rebate of the frame), by optimizing its rigidity. In particular, this laterally and/or transversely tapered geometry of the limbs means that the rigid thermoplastic material which is used for the reinforcement may be present in a greater quantity (i.e. with a greater mass) than in reinforcements of the prior art in the zones in the vicinity of the central portion where, after coating, the retaining lips are located on the support of the profiled element, which permits optimized clamping of its U-shaped grip on said support and that the same rigid thermoplastic material is present in a smaller quantity away from the central portion where the need for clamping is less (since the coating in said zones is accompanied by stabilization lips).

It is also noteworthy that this tapered geometry in the width and/or thickness of the limbs of each arm of the reinforcement relative to the slots forming said limbs, associated with a reduced area of each of said slots in comparison with that of each limb, permits a less jerky entry of the rigid thermoplastic reinforcement in the tool for coating with the flexible material, and thus permits the aforementioned disadvantageous appearance of "dog ribs" for the profiled element to be minimized. The lateral and/or transverse surface of said slots is thus tapered in reverse, opposite the free end of said tapered limbs (i.e. toward the central portion of the reinforcement) and they are designed to be filled with the coating material.

According to a further feature of the invention, said slots may start at the same height along each of said arms, preferably substantially at the junction between each arm and said central portion which is solid or slotted.

According to a further feature of the invention, said central portion may be slotted, having a series of transverse openings formed in a staggered arrangement relative to said slots, at least one of said transverse openings optionally extending over the two respective limbs of said arms which are formed opposite said opening.

It is noteworthy that this staggered arrangement of the openings of the central portion—and possibly of the limbs—relative to the slots of the limbs which translates into a lateral centering of each opening opposite the opposing pair of limbs, makes it possible to confer an increased flexibility to the reinforcement when creating a radius.

According to a further feature of the invention, said reinforcement may be extruded, such that said slots and said limbs are directly extruded.

Advantageously, said reinforcement may be produced in at least one rigid thermoplastic material capable of being extruded and having a Young's modulus of between 1000 MPa and 10 000 MPa as a function of the reinforcing fillers used, and preferably between 2000 MPa and 6000 MPa. Even more advantageously, said thermoplastic material may be based on at least one thermoplastic polymer (TP) which is, for example, selected from the group consisting of polypropylenes, polyamides, polyvinyl chlorides (PVC), polymethylmethacrylates (PMMA), acrylonitrile butadiene-styrene (ABS) terpolymers and their composites, which is preferably a polypropylene reinforced by a filler, for example, selected from the non-exhaustive group consisting of talc, hemp, wood, cork, glass fibers and their composites, the function of this filler being to increase the rigidity of the base material.

It is noteworthy that other thermoplastic polymers are usable to produce a reinforcement according to the invention and that the choice of said polymers provides, in particular, a compromise between the cost and rigidity of the materials in question.

A profiled seal or profiled molding for a motor vehicle according to the invention comprises a thermoplastic reinforcement as defined above and at least one elastomeric coating which is more flexible than said reinforcement and extruded thereon.

According to an embodiment of the invention, said profile comprises:

a part forming the grip which is reinforced by said reinforcement for the mounting thereof on a rebate of a frame and of which the coating is produced in at least one flexible elastomeric material which is compatible with that of the reinforcement and which is preferably based on a rubber, such as an EPDM, or a thermoplastic elastomer (TPE) such as a styrene thermoplastic elastomer (TPS, e.g. a SEBS) or thermoplastic vulcanizate (TPV, e.g. "Santoprene" or "Vegaprene") or other TPE having similar modulus properties at 100% extension and resistance to rupture, a sealing lip being able to extend said part forming the grip by extending opposite one of said arms, and a flexible and deformable seal part which is tubular or in the form of a lip which is produced in at least one elastomeric material (for example a TPE such as a TPV or a TPS or even a rubber such as an EPDM) which is preferably cellular and which extends said part forming the grip into the other arm of the U-shape.

A method for the production according to the invention of a reinforcement as defined above comprises an extrusion of at least one thermoplastic material via a die of U-shaped profile, formed between an extruder head and a receiving member for the material being discharged from said head, which is provided with a hollow cavity designed to form directly said central portion, said slots and said limbs, so that said material thus extruded progressively covers said receiving member, followed by a separation of said material from the receiving member.

It is noteworthy that this extrusion method should not be confused with calendering, which by definition involves the passage of material between two wheels or rotating cylinders.

According to a further feature of the invention, said die may advantageously be formed by a fixed extruder head tangentially covering the periphery of a wheel which forms said receiving member and which rotates about its axis so that its periphery penetrates inside said head so that the extruded material progressively covers said wheel periphery during its rotation, which periphery has, firstly, two peripheral radial flanks respectively having two hollow tooth cavities forming said limbs and said slots when covered by said material and, secondly, a circumferential peripheral top portion having a hollow cavity forming said central portion when covered.

As a variant, said die may be formed by a fixed extruder head tangentially covering the periphery of a track or of a conveyor belt which forms said receiving member and of which the kinematics comprises a series of movements in translation and rotation about two axes, so that the periphery of said track or of said conveyor belt penetrates inside said head so that the extruded material progressively covers said periphery during is kinematic movement, which periphery has, on the one hand, two peripheral radial flanks respectively having two hollow tooth cavities forming said limbs and said slots when covered by said material and, on the other hand, a peripheral top portion having a hollow cavity forming said central portion when covered.

It is noteworthy that it is possible to use by way of a receiving member a further device which is technically equivalent to the aforementioned wheel, the conveyor belt or track, it being understood that the geometry of the reinforcement thus extruded may be implemented depending on the choice of said member.

Advantageously, this method according to the invention is entirely without a post-forming step of said at least one extruded thermoplastic material, such as a cutting, sawing or notching step.

It is noteworthy that the more or less asymmetrical geometry (for example in the shape of a comma) of the limbs of the reinforcement thus extruded according to the invention also makes it possible to improve the separation and thus the removal of said reinforcement relative to the wheel periphery. More specifically a wheel of small diameter involves a removal over a short curved distance and thus a high tangential force of the lower part of the limbs of the U-shape with, as a result, a geometry which is highly asymmetrical, whilst a wheel of larger diameter (extrapolated to a track or conveyor belt) involves reduced stress on the limbs and thus a limb geometry which is possibly able to be generally symmetrical (for example triangular or trapezoidal) relative to its free end. The choice of receiving member is thus closely associated with the desired product, namely that it also influences the cost of the installation.

BRIEF DESCRIPTION OF THE DRAWINGS

Further features, advantages and details of the present invention will emerge from reading the following description of an embodiment of the invention given by way of illustrative and non-limiting example, said description being provided with reference to the accompanying drawings, in which.

DETAILED DESCRIPTION

Figures 1, 2:
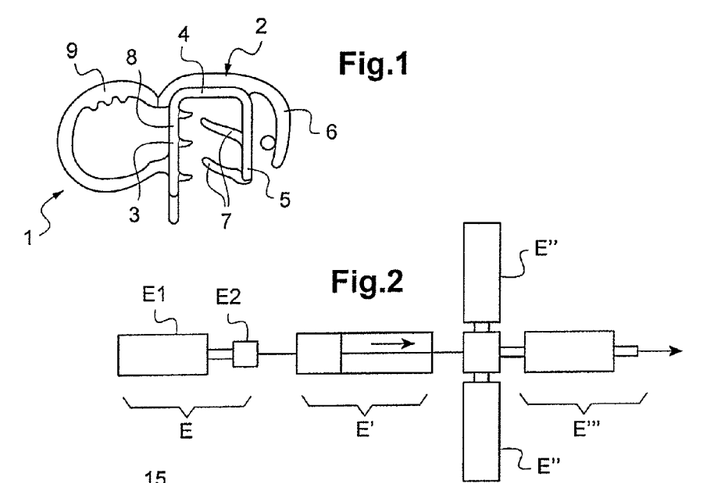
FIG. 1 is a cross-sectional view of a profiled seal of the door seal type for a motor vehicle incorporating in its grip a thermoplastic reinforcement according to the invention.
FIG. 2 is a block diagram showing the principal steps of a method for producing a profiled element according to the invention such as that shown in FIG. 1 with the extrusion of the thermoplastic reinforcement and over-extrusion of a coating to cover said reinforcement.

The profiled seal 1 illustrated in FIG. 1 is designed to form a lateral opening seal of a motor vehicle, providing the seal between said opening and the bodywork of the vehicle and it comprises in the known manner:

a grip 2 made of a flexible elastomeric material (for example based on a TPE such as a TPS or a TPV or indeed a rubber, such as an EPDM) which is reinforced by a rigid thermoplastic U-shaped reinforcement 3 (for example based on a polypropylene) for the mounting thereof on a rebate of a frame and which is extended at the junction between the central portion 4 and an arm 5 of the U-shape by a "cosmetic" lip 6 also produced from a flexible thermoplastic material and folded back along said arm 5, said grip comprising, on the respective internal faces of its arms 5 and 8, lips 7 for hooking onto the rebate, and a sealing tube 9 (advantageously replaced by a lip in some profiled elements) which extends the grip 2 at the junction between the central portion 4 and the other arm 8 of the U-shape, which is produced in a flexible and deformable elastomeric material, (for example a cellular material such as a TPE, for example of the TPS or a TPV type, or a rubber such as an EPDM).

The profiled seals 1 or profiled trim moldings according to the invention, such as those of FIG. 1, are advantageously obtained by a method of extruding the rigid thermoplastic reinforcement 3 with an over-extrusion of the remainder of the profiled element 1 forming the flexible coating of the reinforcement 3, as illustrated in FIG. 2. An initial extrusion step E of the reinforcement 3 may be seen (carried out in an extruder head E1 provided with a die E2, of which the structure and the operation will be disclosed hereinafter), followed by a cooling step E' of the reinforcement 3 thus extruded, then an over-extrusion E" of a flexible elastomeric coating in contact with said extruded and cooled reinforcement 3 and finally a cooling E''' of the extruded profiled element 1 thus obtained.

In addition, it is possible to conceive of an improvement of the behavior of the coating on the reinforcement 3 by incorporating within the production method, before insertion into the coating device, a step of reactivating the surface of the reinforcement 3 (for example by heating, plasma treatment or electrical bombardment of the surface of the "corona" type, for example) or even surface-coating (for example by spraying, drop-by-drop applied by brush) or even over-extrusion of a compatibilizing intermediate layer between the material(s) of the reinforcement 3 and the coating material(s).

Figure 3:
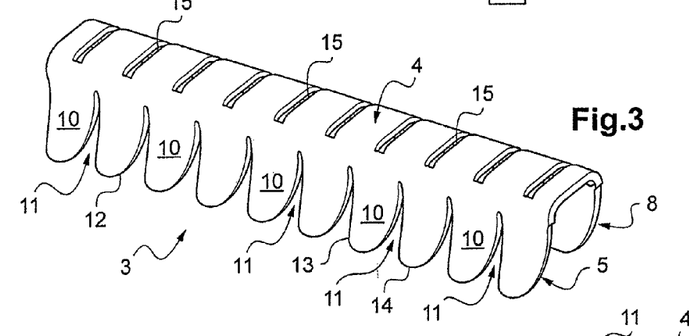
FIG. 3 is a partial schematic view from above and in perspective of a thermoplastic reinforcement according to an embodiment of the invention including the asymmetrical limbs.
Figure 4:
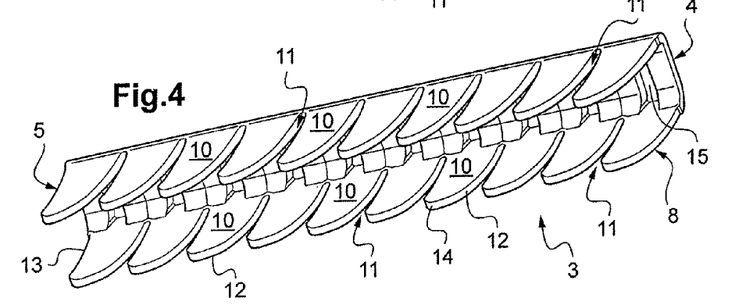
FIG. 4 is a partial schematic view from below and in perspective of the reinforcement of FIG. 3.

The thermoplastic reinforcement 3 illustrated in FIGS. 3 and 4 is thus obtained exclusively by the extrusion of a rigid thermoplastic material, such as a material based on polypropylene, by way of preferred example.

It is possible, for example, to use a polypropylene reinforced by talc at a percentage by weight which is able to vary from 0 to 50% and preferably between 30% and 40%. By way of non-limiting example, it is possible to use 30% talc with a Young's modulus obtained for the reinforcement 3 of approximately 2300 MPa or even 40% talc with, in this case, a Young's modulus for the reinforcement 3 of approximately 4000 MPa.

As a variant, it is possible to use advantageously a polypropylene reinforced by short and/or long glass fibers at a percentage by weight of glass fibers which is able to vary from 0 to 60% and preferably between 30% and 40%, with a Young's modulus obtained for the reinforcement 3 of approximately 5900 MPa for 30% long glass fibers and approximately 6600 MPa for 30% short glass fibers.

According to further variants of the invention, it is possible to use a polypropylene reinforced by short and/or long hemp fibers at a percentage by weight of hemp which is able to vary from 0 to 40% or even reinforced by a mixture of talc and glass fibers, by way of non-limiting example.

Figure 5:
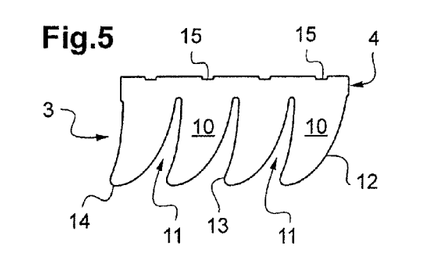
FIG. 5 is a partial lateral schematic view of the reinforcement with asymmetrical limbs of FIGS. 3 and 4.

As visible in FIGS. 3 to 5, a reinforcement 3 according to the invention has a central portion 4 and two arms 5 and 8 respectively comprising over their length a series of pairs of asymmetrical limbs 10 laterally opposite one another which are separated from one another by slots 11 and which are profiled toward the free edges of the arms 5 and 8, having substantially in this example the shape of a comma at the edges 12 and 13 which are continuously curved from the start of the adjacent slots 11 (said edges 12 and 13 being preferably respectively convex and concave) and rounded at the free end 14. Said slots 11 start at the same height along each arm 5, 8 at the junction between said arm and the central portion 4, which is perforated by having in this example a series of transverse openings 15 parallel with one another over the length of the reinforcement 3, said openings being in a staggered arrangement relative to the slots 11.

It is seen that the slots 11 each have an area which is markedly smaller than that of each adjacent limb 10 such that said slots 11 form in this example fine interstitial notches at the curved edges between the limbs 10 in the shape of commas, with the above advantages.

Figure 6:
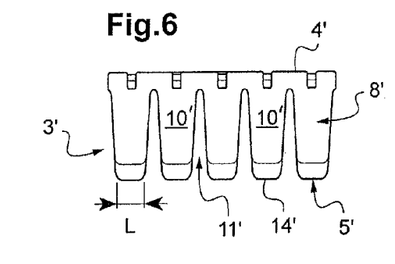
FIG. 6 is a partial lateral schematic view showing an example of symmetrical limbs able to be included in a reinforcement according to the invention, in addition to asymmetrical limbs such as those shown in FIG. 5.

In FIG. 6 a reinforcement 3' according to the invention has been shown, of which the two arms 5' and 8' are of different heights starting from the central portion 4' and of which certain pairs of limbs 10' of said two arms 5' and 8' have limbs 10' which, seen laterally, each have a symmetrical geometry, i.e. in this example substantially in the form of an isosceles trapezium in contrast to the asymmetrical limbs 10 above (not visible in FIG. 6), also included in said reinforcement 3'.

Figure 7:
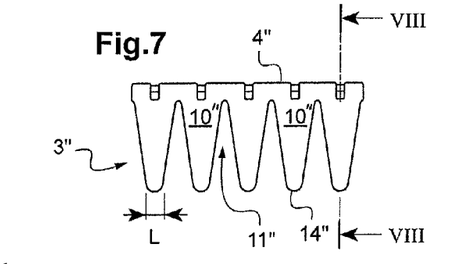
FIG. 7 is a partial lateral schematic view showing further symmetrical limbs able to be included in a reinforcement according to a variant of the invention, in addition to the asymmetrical limbs of FIG. 5.

The reinforcement 3" according to the variant of FIG. 7 is solely distinguished from that of FIG. 6 in that its two arms are of the same height starting from the central portion 4" and have certain pairs of limbs 10" of which the symmetrical geometry is closer to that of an isosceles triangle (i.e. an isosceles trapezium terminating at its free end 14" by a small base of reduced width relative to the base of each limb 10").

Said reinforcements 3' and 3" with symmetrical limbs 10' and 10" are thus characterized by a width L which continuously decreases from the adjacent slots 11' and 11" and toward their respective free ends 14' and 14" (namely it is possible as a variant for the edges of said limbs 10' and 10" not to be oblique but curved).

Figure 8:
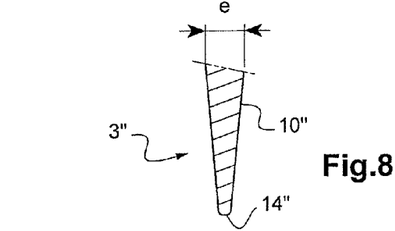
FIG. 8 is a partial view in cross section in the plane VIII-VIII of FIG. 7 of such a symmetrical limb able to be included in a reinforcement according to the invention.

Moreover and illustrated in FIG. 8, the transverse thickness e of each of said symmetrical limbs 10' and 10" may advantageously decrease toward the free ends 14', 14" thereof or be selected to be constant. As indicated above, it is noteworthy that as a variant said decreasing thickness e could characterize the laterally asymmetrical limbs 10 and/or symmetrical limbs of uniform width L (not illustrated) included in a reinforcement according to the invention.

Figure 9:
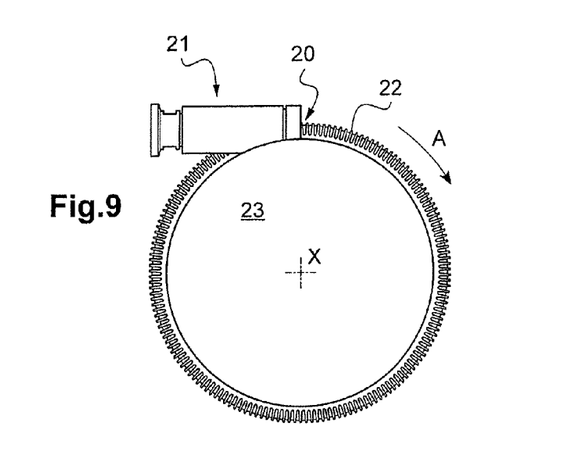
FIG. 9 is a lateral schematic view of an extruder head receiving a rotating wheel provided with a peripheral hollow cavity and cooperating with said head to form an extrusion die for a reinforcement according to the invention.
Figure 10:
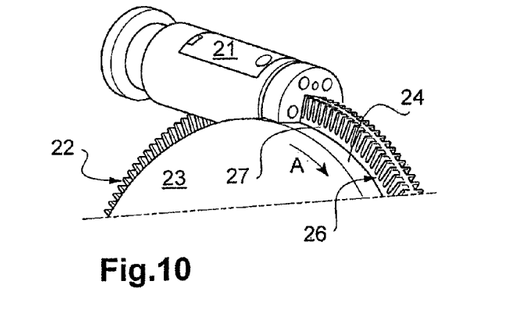
FIG. 10 is a partial schematic view in lateral perspective showing in an enlarged view the rotation of the wheel of FIG. 9 inside the extruder head.
Figure 11:
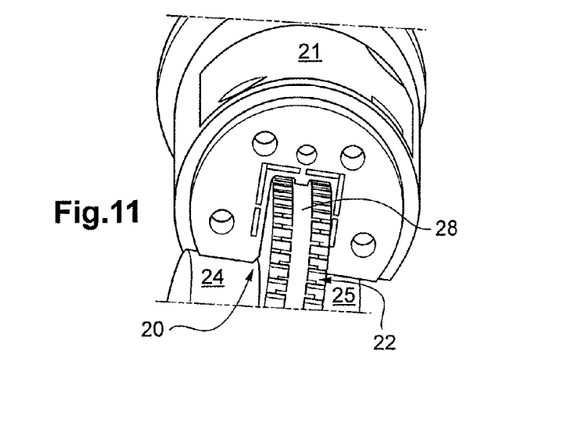
FIG. 11 is a partial schematic view from the front and in perspective showing in an enlarged view the geometry of the extrusion die of the reinforcement illustrated in FIGS. 9 and 10, which is defined by the gap present between the inside of the extruder head and the wheel cavity.

As will be disclosed here with reference to FIGS. 9 to 13, said slots 11 and said limbs 10 are exclusively extruded (i.e. without calendering and without subsequent cutting, notching or sawing operations in contrast to the prior art). Said figures and in particular FIGS. 10 and 11 show schematically the geometry of the extrusion die 20 of U-shaped profile which is used to obtain a reinforcement 3 according to the invention which is visible during the extrusion process in FIG. 12.

Said die 20 is formed by a fixed extruder head 21 tangentially covering the periphery 22 of a wheel 23 which is driven in rotation about its axis of symmetry X in the direction of the arrow A and is designed to receive on its periphery 22 the thermoplastic material (for example reinforced polypropylene) discharged from the head 21, so that said periphery 22 penetrates the inside of the head 21 and is then covered by the extruded material 3. More specifically and as visible in FIG. 11, the wheel periphery 22 is connected to the remainder of the wheel 23 by two circumferential shoulders 24 and 25 which are symmetrical to one another relative to said periphery 22 and which are surmounted by the exterior of the extruder head 21.

The wheel periphery 22 is provided with hollow cavities designed to form directly the reinforcement 3 and this periphery 22 comprises, more specifically:
  two peripheral radial flanks 26 respectively having two identical tooth cavities 27 designed to form the limbs 10 and slots 11 when covered, and
  a circumferential peripheral top portion 28 having a hollow cavity designed to form the central portion 4 when covered.

Figure 12:
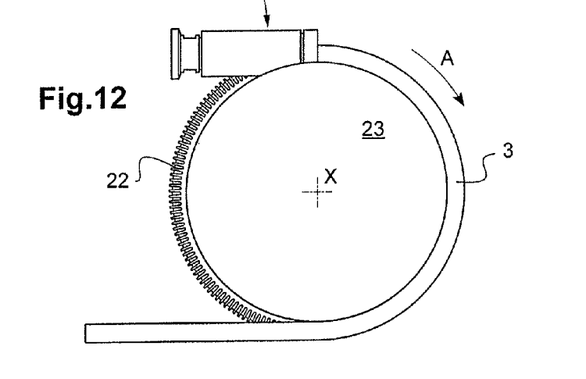
FIG. 12 is a lateral schematic view of the extruder head receiving the rotating wheel according to FIGS. 9 to 11, the peripheral cavity of said wheel being progressively covered by the extruded material designed to form the reinforcement.
Figure 13:
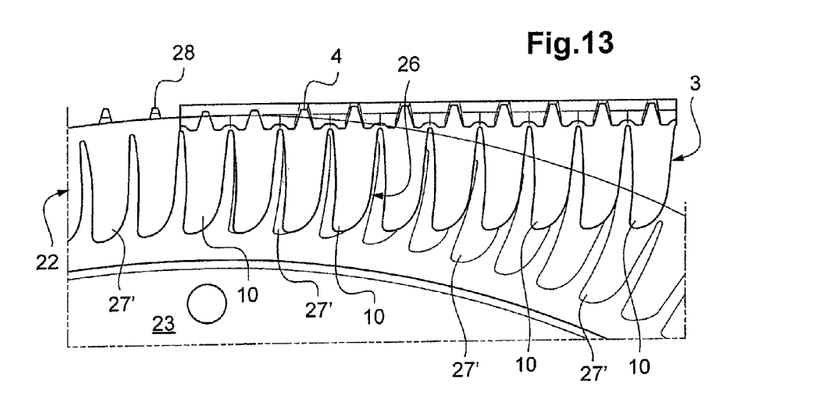
FIG. 13 is a partial lateral view illustrating the separation of an extruded reinforcement according to the invention from the peripheral cavity of such a rotating wheel.

For the purposes of the simplification of FIGS. 9, 10 and 12, the precisely asymmetrical shape of the hollow teeth 27 formed on the radial flanks 26 of the wheel periphery 22 has not been shown in said figures, it being understood that this asymmetrical form is, for example, that illustrated in FIG. 13, with cavities 27' in the shape of commas designed to form the reinforcement 3 as that of FIGS. 3 to 5. As indicated above and visible in said FIG. 13, it is noteworthy that said asymmetrical geometry of the limbs 10 has, in particular, the advantage of improving the separation of said extruded reinforcement 3 relative to the wheel periphery 22, in comparison with reinforcements having limbs which are generally triangular or trapezoidal but symmetrical relative to their free end (i.e. limbs in the form of an isosceles triangle with a pointed or rounded or flat top portion).

The invention claimed is:

1. A bendable thermoplastic reinforcement of substantially U-shaped cross section for reinforcing a profiled element of a motor vehicle selected from the group consisting of profiled seals and profiled trim moldings, the reinforcement having a central portion and two arms, each arm comprising over its length a series of limbs which are separated from one another by slots,
    wherein over at least one part of the length of the reinforcement, each limb has laterally an asymmetrical geometry and an area greater than that of each adjacent slot,
    wherein said arms comprise a series of pairs of said asymmetrical limbs which, within each pair, are formed laterally opposite one another, each asymmetrical limb ending in a free end having a longitudinal width which is smallest for the limb, and wherein each asymmetrical limb has substantially a shape of a comma defined by a first tooth edge having a convexly curved profile and by a second tooth edge having either a straight profile or concavely curved profile, said first tooth edge and said second tooth edge being joined at said free end which is of pointed or rounded shape, said at least one part of the reinforcement being substantially in a form of a saw-toothing having teeth inclined on a same side.

2. The reinforcement as claimed in claim 1, wherein at least a part of said limbs, optionally including said laterally asymmetrical limbs, are each tapered with a longitudinal width (L) or a transverse thickness (e) continuously decreasing toward the free end of said limb.

3. The reinforcement as claimed in claim 1, wherein said slots start at a same height along each of said arms.

4. The reinforcement as claimed in claim 1, wherein said central portion is slotted, having a series of transverse openings formed in a staggered arrangement relative to said slots, at least one of said transverse openings optionally extending over the two respective limbs of said arms which are formed opposite said opening.

5. The reinforcement as claimed in claim 1, wherein the reinforcement is extruded, said slots and said limbs being directly extruded.

6. The reinforcement as claimed in claim 1, wherein the reinforcement is produced in at least one thermoplastic material capable of being extruded and having a Young's modulus of between 1000 MPa and 10 000 MPa.

7. The reinforcement as claimed in claim 6, wherein said thermoplastic material is based on at least one thermoplastic polymer (TP) selected from the group consisting of polypropylenes, polyamides, polyvinyl chlorides (PVC) polymethylmethacrylates (PMMA), acrylonitrile butadiene-styrene (ABS) terpolymers and their composites.

8. A profiled element for a motor vehicle selected from the group consisting of profiled seals and profiled trim moldings, said profiled element comprising a thermoplastic reinforcement and at least one elastomeric coating which is based on at least one thermoplastic elastomer (TPE) or on at least one rubber and which is more flexible than said thermoplastic reinforcement and is extruded thereon, wherein said thermoplastic reinforcement is as defined in claim 1.

9. The profiled element as claimed in claim 8, wherein the profiled element comprises:

a part forming a grip which is reinforced by said reinforcement for a mounting thereof on a rebate of a frame and of which the coating is produced in a material which is compatible with that of the reinforcement, and which is based on at least one thermoplastic elastomer (TPE) or a thermoplastic vulcanizate (TPV), and a flexible and deformable seal part which is produced in an elastomeric material and which extends said part forming the grip into one arm of the U-shape.

10. A method for the production of a reinforcement as claimed in claim 1, wherein the method comprises an extrusion of at least one thermoplastic material via a die of U-shaped profile, formed between an extruder head and a receiving member for the material being discharged from said head, which receiving member is provided with a hollow cavity designed to form directly said central portion, said slots and said limbs, so that said material thus extruded progressively covers said receiving member, followed by a separation of said material from the receiving member.

11. The method as claimed in claim 10, wherein said die is formed by a fixed extruder head tangentially covering a periphery of a wheel which forms said receiving member and which rotates about its axis (X) so that its periphery penetrates inside said head so that the extruded material progressively covers said wheel periphery during its rotation, which periphery has, firstly, two peripheral radial flanks respectively having a hollow tooth cavity forming said limbs and said slots when covered by said material and, secondly, a circumferential peripheral top portion having a hollow cavity forming said central portion when covered.

12. The method as claimed in claim 10, wherein said die is formed by a fixed extruder head tangentially covering a periphery of a track or of a conveyor belt which forms said receiving member and of which a kinematics comprises a series of movements in translation and rotation about two axes, so that the periphery of said track or of said conveyor belt penetrates inside said head so that the extruded material progressively covers said periphery during its a kinematic movement of said periphery, which periphery has, firstly, two peripheral radial flanks respectively having two hollow tooth cavities forming said limbs, and said slots when covered by said material and, secondly, a peripheral top portion having a hollow cavity forming said central portion when covered.

13. The method as claimed in claim 10, wherein the method is without a post-forming step of said at least one extruded thermoplastic material, such as a cutting, sawing, notching or calendering step.

14. The reinforcement as claimed in claim 1, wherein the reinforcement is produced in at least one thermoplastic material capable of being extruded and having a Young's modulus of between 2000 MPa and 6000 MPa.

15. The reinforcement as claimed in claim 1, wherein said slots start at a same height along each of said arms and substantially at a junction between each arm and said central portion.

* * * * *

UNITED STATES PATENT AND TRADEMARK OFFICE
CERTIFICATE OF CORRECTION

| | | |
|---|---|---|
| PATENT NO. | : 8,769,877 B2 | Page 1 of 1 |
| APPLICATION NO. | : 13/575471 | |
| DATED | : July 8, 2014 | |
| INVENTOR(S) | : Baratin et al. | |

It is certified that error appears in the above-identified patent and that said Letters Patent is hereby corrected as shown below:

In the claims:

Column 10,
Line 34, "during its a kinematic" should read --during a kinematic--.

Signed and Sealed this
Fourth Day of November, 2014

Michelle K. Lee
*Deputy Director of the United States Patent and Trademark Office*